(12) United States Patent
Biver et al.

(10) Patent No.: US 8,736,944 B2
(45) Date of Patent: May 27, 2014

(54) TRANSPARENT ELECTROCHROMIC SYSTEM

(75) Inventors: Claudine Biver, Charenton-le-Pont (FR); Jean-Paul Cano, Charenton-le-Pont (FR); Sandrine Duluard, Charenton-le-Pont (FR); Anthony Saugey, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 131 days.

(21) Appl. No.: 13/386,878

(22) PCT Filed: Jul. 19, 2010

(86) PCT No.: PCT/FR2010/051510
§ 371 (c)(1),
(2), (4) Date: Jan. 24, 2012

(87) PCT Pub. No.: WO2011/015753
PCT Pub. Date: Feb. 10, 2011

(65) Prior Publication Data
US 2012/0120477 A1    May 17, 2012

(30) Foreign Application Priority Data

Jul. 28, 2009 (FR) .................... 09 55265

(51) Int. Cl.
*G02F 1/153* (2006.01)
*G02F 1/15* (2006.01)
*G09G 3/38* (2006.01)
*H04N 9/16* (2006.01)

(52) U.S. Cl.
USPC ........... 359/275; 359/265; 345/105; 348/817

(58) Field of Classification Search
USPC ................ 349/182–186; 359/265–275, 277, 359/245–247, 254, 242; 345/49, 105; 250/70; 348/814, 817
See application file for complete search history.

(56) References Cited

U.S. PATENT DOCUMENTS

| | | | |
|---|---|---|---|
| 4,212,518 A | 7/1980 | Imataki et al. | |
| 4,218,120 A | 8/1980 | Kawamura et al. | |
| 4,285,575 A | 8/1981 | Imataki et al. | |
| 5,142,407 A | 8/1992 | Varaprasad et al. | |
| 6,020,987 A * | 2/2000 | Baumann et al. | ............ 359/273 |
| 6,950,220 B2 | 9/2005 | Abramson et al. | |

(Continued)

FOREIGN PATENT DOCUMENTS

| JP | 59219723 A | 12/1984 |
|---|---|---|
| JP | 2006119344 A | 5/2006 |

*Primary Examiner* — Dawayne A Pinkney
(74) *Attorney, Agent, or Firm* — Seed IP Law Group PLLC

(57) ABSTRACT

A transparent electrochromic system includes a cellular structure, two power supply electrodes together supported on a single wall, and at least one additional electrode. The additional electrode can be used as a reference electrode or as a polarization electrode. The additional electrode can also form a condenser with a fourth electrode that is added to the system, in order to control a migration of certain electroactive substances responsible for coloring and decoloring the system. The operation of the system can thus be improved.

22 Claims, 3 Drawing Sheets

(56) References Cited

U.S. PATENT DOCUMENTS

Figure 1:
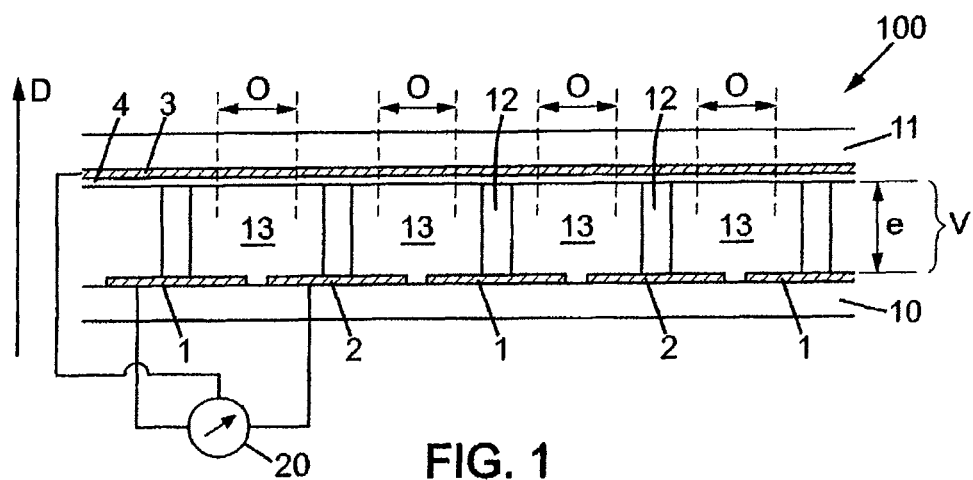

| | | |
|---|---|---|
| 2002/0005977 A1 | 1/2002 | Guarr et al. |
| 2002/0141221 A1* | 10/2002 | Chernobrod et al. ......... 365/110 |
| 2004/0241517 A1 | 12/2004 | Shinozaki et al. |
| 2004/0257633 A1 | 12/2004 | Agrawal et al. |
| 2005/0128560 A1 | 6/2005 | Vincent et al. |
| 2007/0109218 A1* | 5/2007 | Saito et al. ...................... 345/55 |
| 2009/0195883 A1 | 8/2009 | Archambeau et al. |
| 2012/0307340 A1 | 12/2012 | Archambeau et al. |

* cited by examiner

TRANSPARENT ELECTROCHROMIC SYSTEM

The present invention relates to a transparent electrochromic system, and to a method for using such a system.

Many transparent electrochromic systems are already available, in which electroactive substances are simultaneously oxidized and reduced in contact with power supply electrodes. At least some of these electroactive substances have colors which are different between their oxidized and reduced forms. The system thus changes color and/or has a variable light absorption when an electrical command applied between the power supply electrodes is itself varied.

In the context of the present description, power supply electrodes of an electrochromic system which incorporates substances which can be oxidized or reduced during operation of the system, means electrodes which are intended to transfer electrons to those substances that are intended to be reduced, or to receive electrons from substances that are intended to be oxidized. Thus, an electrical current flows in the power supply electrodes. The electrical command of the electrochromic system may be this current directly. Alternatively, the electrical command may be an electrical voltage which is applied between the two power supply electrodes. In any case, an inverse operation of the electrochromic system is obtained when the polarity of the power supply electrodes is reversed.

In a manner known per se, such a transparent electrochromic system can be incorporated in a glazing, an ophthalmic lens, a mask glass or a helmet visor. In general, transparent system means a system which allows clear vision across it, that is to say, which enables an observer positioned on one side of the system to see clearly an object or a scene located at some distance and on the other side of the system. In other words, the system does not cause any scattering or diffraction of the light transmitted across it, that is perceptible to the observer and blurs his vision, regardless of the electrical status of the system.

It is also known how to make such an electrochromic system in the form of a set of cells which are juxtaposed with one another, parallel to outer walls of the system. Such a configuration has many advantages, including the reduction of leaks, to the exterior of the system, of a fluid medium which contains the electroactive substances, an increase in the compressive strength of the system, etc. In this case, the transparent electrochromic system comprises:

two outer walls which are parallel, the system being transparent for a viewing direction across these outer walls between two opposite sides;

a network of internal walls which is placed between the two outer walls and which defines the set of cells, the internal walls extending perpendicularly to the outer walls;

portions of liquid and/or gel which are contained respectively in the cells;

first and second electroactive substances which are distributed in the portions of liquid and/or gel, with respective electrical redox potentials that are different, at least some of these electroactive substances having a variable optical effect between an oxidized form and a reduced form thereof; and two transparent power supply electrodes, which are intended to be connected respectively to two power supply terminals of a variable electrical power supply unit, each of these power supply electrodes being in direct electrical contact with the portions of liquid and/or gel which are contained in at least some of the cells for transferring electrons to or from at least some of the electroactive substances, in an inverse way between the first and second electroactive substances at a given time.

Finally, it is also known, for such a cellular transparent electrochromic system, how to place the two power supply electrodes on a single one of the two outer walls, without them being in direct electrical contact with one another. The two power supply electrodes are then juxtaposed on the side of this outer wall which is turned toward the medium that contains the electroactive substances, being separated from one another by an electrically insulating strip. Such an arrangement of the power supply electrodes serves in particular to reduce a contribution therefrom to the light absorption of the system, regardless of its electrochemical state. The electrochromic system can then have a contrast which is higher during commanded operation. Furthermore, this arrangement of the two power supply electrodes on the same outer wall serves to obtain electrochromic systems which are thin, in particular in which the thickness of the medium containing the electroactive substances is lower than 50 μm (microns), for example about 20 μm.

However, the following difficulties and drawbacks have been observed during the operation of such a cellular transparent electrochromic system:

although the difference in electrical potential between the two power supply electrodes is controlled, the value of the electrical potential on each electrode is not individually controlled. This can result in irreversible deterioration of the electroactive substances, culminating in damage to the electrochromic system;

the electroactive substances which have been converted between their oxidized and reduced forms on one or the other of the power supply electrodes are mutually neutralized in a zone located between the two power supply electrodes. This results in useless electrical current consumption with regard to the optical efficiency of the electrochromic system;

the mutual neutralization of the electroactive substances which have reacted on one or the other of the power supply electrodes produces a band between these two electrodes, in which the coloration of the system is poorly controlled; and a time lag may occur between a modification of an electrical voltage which is applied between the power supply electrodes to command a color change of the electrochromic system and the actual appearance of this color change. In other words, the response time of the system may be too long for some applications.

It is therefore an object of the present invention to remedy at least one of these drawbacks.

For this purpose, the invention proposes a cellular transparent electrochromic system as described above, in which the power supply electrodes are carried by a single one of the two outer walls of the system, and which further comprises at least one additional transparent electrode. This additional electrode is not in direct electrical contact with the power supply electrodes inside the electrochromic system. Furthermore, it is parallel to the power supply electrodes inside at least some of the cells.

According to a first use of the additional electrode, it may be used to set a value of the electrical potential in the portions of liquid and/or gel outside the power supply electrodes. This is accordingly a reference electrode, which prevents the electrical potential, inside the cells, from locally assuming absolute values which are too high and liable to damage the electroactive substances. In this case, the additional electrode is in contact with the portions of liquid and/or gel, and it is kept at an electrical potential that lies within an electrochemical stability range of the electrochromic system.

According to a second use of the additional electrode, it may also be used to reduce the mutual neutralization of the electroactive substances which have reacted with the power supply electrodes. For example, an electrical potential can be applied to the additional electrode, which keeps aside some of these substances when their oxidized or reduced form that has been produced on one of the power supply electrodes has an electrical charge. In this way, useless electrical power consumption can be averted. Similarly, the zone in which the electroactive substances are mutually neutralized may thus be less visible.

Finally, according to a third use, the additional electrode may also be used to attract one of the electroactive substances in its oxidized or reduced form, when it is electrically charged, toward the power supply electrode on which this substance is intended to react. An appropriate polarization of the additional electrode thereby serves to shorten the response time of the electrochromic system.

For the second and third uses of the additional electrode, the electrical potential which is applied thereto may lie within or outside the interval bounded by the electrical potentials that are applied respectively to the two power supply electrodes. The electrochromic system may then further comprise an electrically insulating film which is placed between the additional electrode and the portion of the liquid and/or gel contained in each cell. In this way, electric contact between the portion of liquid and/or gel and the additional electrode is prevented. The additional electrode does not then conduct any electrical current during operation of the system, and its role is limited to a capacitive effect within the system. Such an electrically insulating film is recommended when the electrical potential applied to the additional electrode lies outside the interval bounded by the electrical potentials applied respectively to the two power supply electrodes. It then prevents some of the electroactive species from being oxidized or reduced in contact with the additional electrode, or from being irreversibly damaged upon such contact.

The additional electrode introduced by the invention may be carried by the other one of the two outer walls of the system than the one carrying the two power supply electrodes.

Alternatively, it may be carried by the same outer wall as the one carrying the two power supply electrodes. In this case, the additional electrode may be placed between the two power supply electrodes, along a direction parallel to the outer wall. It may also be placed between the outer wall and the two power supply electrodes, along a direction perpendicular to the outer wall, with an insulating film placed between the additional electrode and each of the power supply electrodes. In the latter configuration, and if the additional electrode is not in contact with the portions of liquid and/or gel, its function is limited to the second or the third use mentioned above.

Optionally, the system may further comprise another additional electrode which is carried by the other one of the outer walls than the one carrying the first additional electrode.

An electrochromic system according to the invention may further comprise an electrical power supply unit having three output terminals, in which two of these output terminals are connected electrically and respectively to the two power supply electrodes to generate an electrical current that flows in the system. The third output terminal of the electrical power supply unit is connected to the additional electrode. The power supply unit is accordingly suitable for variably controlling at least one electrical voltage which is present between one of the power supply electrodes and the additional electrode.

When the system comprises two additional electrodes, the electrical current supply of the power supply electrodes on the one hand, and an electric bias voltage which is applied between the two additional electrodes on the other hand, may be supplied respectively by two independent electrical power supply units.

An electrochromic system according to the invention is particularly suitable for forming a glazing, an aircraft window, an ophthalmic lens, a helmet visor, a mask glass or a wafer which is intended to be applied to an ophthalmic lens, a helmet visor or a mask glass.

The invention also proposes a method for using a transparent electrochromic system according to the invention, whereby an electrical voltage is applied between the additional electrode and at least one of the power supply electrodes, so that the additional electrode has an electrical potential lying outside an interval bounded by the respective electrical potentials of the power supply electrodes, all the electrical potentials being measured with regard to a common reference terminal.

Other features and advantages of the present invention will appear in the description below of nonlimiting exemplary embodiments, with reference to the appended drawings, in which:

FIGS. 1 to 6 show cross sections of electrochromic systems according to the invention, conforming to various embodiments.

For the clarity of these figures, the dimensions of the elements shown are not proportional to actual dimensions, nor to actual dimensional ratios. Furthermore, identical references which are used in different figures denote elements that are identical or which have identical functions.

An electrochromic system 100 according to the invention comprises two outer walls 10 and 11, which are transparent and parallel to one another. The walls 10 and 11 may be made from glass or any other organic material that is transparent to visible light. In the figures, the walls 10 and 11 are flat, but it is understood that they may alternatively be curved, concave or convex, according to the particular application of each electrochromic system. Furthermore, they may have any dimensions, in length and in width. For example, one of the two outer walls 10 or 11 may be an ophthalmic lens and the other outer wall may be a transparent film joined to this lens. For such an application, the lens that forms one of the outer walls may be made from any transparent organic material used in the ophthalmic field and the film may be made of polyethylene terephthalate, for example. The outer walls 10 and 11 are kept at a distance from one another, in order to define an internal volume V which they enclose. The volume V is closed, for example by a peripheral seal, not shown. The volume V may have a thickness e of 20 µm, for example, perpendicular to the outer walls 10 and 11.

In all the figures, D denotes a light direction across the electrochromic system 100 between two opposite sides thereof. For example, the direction D may be substantially perpendicular to the walls 10 and 11. In particular, the system 100 is transparent to an observer looking through the system along direction D.

The wall 10, for example, carries two transparent electrodes 1 and 2. These may consist of any electrically conductive material, which appears to be transparent when its thickness is very low, or which is intrinsically transparent. For example, the electrodes 1 and 2 may be made from tin-doped indium oxide (ITO for indium tin oxide) or of fluorine-doped tin oxide ($SnO_2$:F). The electrodes 1 and 2 are placed on the side of the wall 10 which is internal to the system, so as to substantially cover this entire side without being in direct contact with one another. For example, the electrodes 1 and 2 may have an interlacing comb pattern, so that these electrodes appear alternately in the figures, in a cross-sectional plane that is perpendicular to the teeth of the combs. Other patterns can be used equivalently. To be electrically isolated from one another, the electrodes 1 and 2 are separated by a strip that is at least partly devoid of conductive material. The width of this strip may, for example, be about 18 µm.

The electrodes 1 and 2 are intended to be connected electrically to a variable electrical power supply referenced 20 or 21, according to the embodiment concerned. A person skilled in the art knows how to design and make the necessary electrical connections, so that a description thereof is not given here.

A fluid medium is enclosed in the volume V. This medium may be a liquid or a gel, depending on its composition. It contains the electroactive substances which are intended to be oxidized or reduced on the power supply electrodes 1 and 2 during operation of the system 100. It may also contain other additives such as a solvent common to the electroactive substances, anti-UV agents, plasticizers, etc.

The electroactive substances which are contained in the volume V may, as an illustrative example, be:
  N,N,N',N'-tetramethylphenylenediamine, which has a redox potential of about 0.2 V compared to a saturated calomel reference electrode. It is colorless in its reduced form and blue in its oxidized form; and
  ethyl viologen diperchlorate, or N,N'-diethyl-4,4'-bipyridinium diperchlorate, which has a redox potential of about −0.7 V compared to the saturated calomel electrode. It is colorless in its oxidized form and blue in its reduced form.

When the voltage is zero between the two power supply electrodes 1 and 2, the first of these two substances is in its reduced form, and the second in its oxidized form, due to the value of their respective redox potentials. The electrochromic system is then in its clear state, with a high light transmittance, for example higher than 70%. When the voltage applied between the electrodes 1 and 2 is higher than about 0.9 V, N,N,N',N'-tetramethylphenylenediamine is oxidized in contact with that of the electrodes 1 and 2 which is connected to the positive output terminal of the electrical power supply, and ethyl viologen is reduced in contact with the other electrode connected to the negative terminal of the power supply. The electrochromic system 100 accordingly becomes absorbing with a blue color, and its light transmittance may then be lower than 40%, for example, or even lower than 10%, depending on the concentration of the electroactive species in particular.

These two substances may be introduced into the volume V with each having a concentration between 0.001 and 0.5 mol/l (moles per liter), depending on the level of light absorption desired for the absorbent state of the electrochromic system 100. For example, the concentrations of the two electroactive species mentioned above may be 0.2 mol/l.

The volume V included between the outer walls 10 and 11 is divided into separate cells, referenced 13. The medium in which the electroactive substances are distributed is therefore itself also divided into portions, which are respectively contained in the cells 13. For this purpose, internal walls 12 are added to the electrochromic system, to separate the cells 13 from one another. The internal walls 12 are perpendicular to the outer walls 10 and 11, and form a network parallel to said outer walls to define the cells 13. The composition and embodiment of the walls 12 are presumed to be known to a person skilled in the art and are not repeated here. For example, the walls 12 may each have a thickness higher than 0.1 µm, preferably between 0.5 and 8 µm, and each cell 13 may have a dimension which is between 50 µm and 1.5 mm for example, parallel to the outer walls 10 and 11. The cells 13 then form a paving of the electrochromic system 100, parallel to the walls 10 and 11, whereof the pattern may be any pattern, regular, for example hexagonal, or random or pseudo-random.

Regardless of the arrangement of the additional electrode which is introduced into the electrochromic system by the present invention, the network of internal walls 12 may have two distinct configurations with regard to the power supply electrodes.

Figure 2:
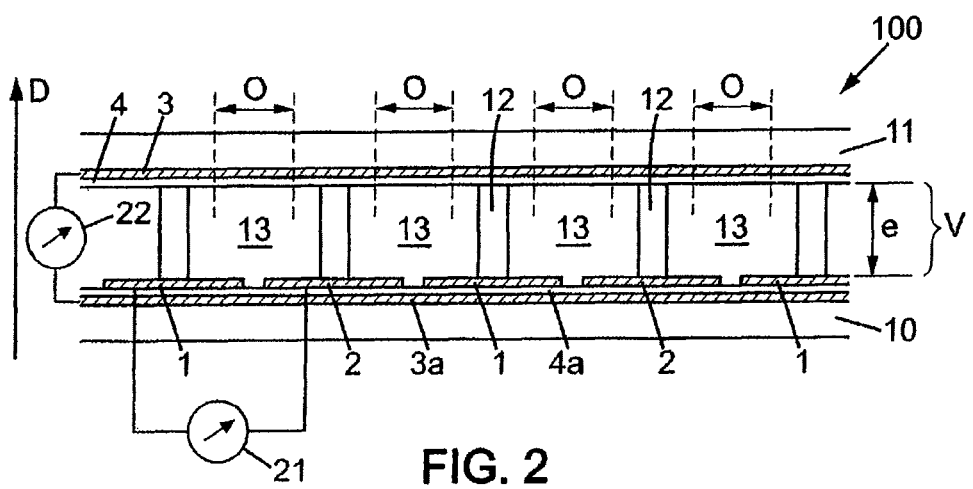

According to a first configuration of the internal walls 12, which is adopted in the embodiments of the invention shown in FIGS. 1 and 2, the portions of liquid and/or gel contained in at least some of the cells 13 are each in direct contact with the two power supply electrodes 1 and 2 inside the corresponding cells. In this case, respective extensions of the two electrodes 1 and 2 may be common to cells 13 which are adjacent, with some of the internal walls 12 being located on these extensions. Such walls 12 are narrower than the extensions of the electrodes 1 or 2 on which they are located, so that the electrodes 1 and 2 extend substantially into the cells 13. Each cell 13 is then electrically supplied by the two electrodes 1 and 2, and the portions of liquid and/or gel contained in the cells 13 may all have the same chemical composition. Under these conditions, the cells 13 may be filled collectively, from a given total quantity of liquid and/or gel. In such embodiments, each cell 13 forms a self-contained electrochromic subsystem, and all the cells are electrically commanded in parallel to produce simultaneous variations of light transmittance.

According to a second configuration of the internal walls 12, which is adopted in the embodiments in FIGS. 3 to 6, the portions of liquid and/or gel contained in at least some of the cells 13 are each in direct contact with only one of the two power supply electrodes 1 or 2 inside the corresponding cells. In this case, a cell 13 whereof the portion of liquid and/or gel is in direct contact exclusively with one of the two power supply electrodes 1 or 2 is adjacent to at least one other cell 13 whereof the portion of liquid and/or gel is in direct electrical contact exclusively with the other power supply electrode. The system then further comprises an ionic bridge 14 which connects these portions of liquid and/or gel of the adjacent cells. Such ionic bridges may consist of the internal walls 12, if they are porous and contain ionic species, or else be located between ends of the internal walls 12 and one of the outer walls 10 or 11. In such a configuration of the internal walls 12 with regard to the power supply electrodes 1 and 2, each cell 13 forms a half-battery, which is electrically coupled with at least one other complementary and adjacent half-battery, when they are each supplied by a distinct electrode.

For this second configuration of the walls 12, and in particular when each electrode 1 or 2 is connected constantly either to the positive output terminal or to the negative output terminal of the electrical power supply 20, it is unnecessary for all the portions of liquid and/or gel contained in the cells 13 to have the same chemical composition. In particular, the cells 13 whereof the portion of liquid and/or gel is in contact with that of the electrodes 1 and 2 which is connected to the positive terminal, may only contain those of the electroactive substances which have a positive redox potential. Conversely, the cells 13 whereof the portion of liquid and/or gel is in contact with the electrode which is connected to the negative output terminal of the electrical power supply 20 may only contain electroactive substances that have a negative redox potential. Useless consumption of the electroactive substances can thus be averted. Furthermore, the concentration of active species can be increased advantageously within each cell, to obtain a higher amplitude of the variation of light absorption. In this case, the cells of both types must be filled differently, from two different initial compositions. The concentrations mentioned above in the present description must then be considered as average values for all the cells 13 of the entire electrochromic system 100.

In the embodiment of the invention shown in FIG. 1, each cell 13 is supplied by the two transparent electrodes 1 and 2, which are carried by the outer wall 10. The electrochromic system 100 further comprises an additional electrode 3 which is carried by the wall 11. The additional electrode 3 may optionally be covered by an insulating film 4, which thus ensures electrical isolation between the electrode 3 and the portions of liquid and/or gel contained in the cells 13. The additional electrode 3 and the insulating film 4 are transparent. For example, the additional electrode 3 may be made from tin-doped indium oxide and the film 4 may be based on polyparaxylylene. The respective thicknesses of the electrode 3 and of the film 4 may be 0.3 μm (microns) and 1 μm, respectively, for example.

The additional electrode 3 may have a plurality of configurations. It may in particular extend continuously between two cells 13 which are adjacent, along directions parallel to the outer walls 10 and 11. In this case, it may extend uninterruptedly opposite at least a portion of all the cells 13. In other words, the additional electrode 3 may not have any opening so as to substantially cover the entire wall 11 of the system 100. Alternatively, the additional electrode 3 may have openings O which are aligned respectively with the central portions of at least some of the cells 13, along a direction perpendicular to the outer walls 10 and 11. In FIG. 1, such openings O are only shown by the positions of their boundaries, to indicate their optional nature. Such openings O serve to increase the light transmittance of the system 100, by partially eliminating a light absorption that could be caused by the additional electrode 3 at the location of the openings O.

The system 100 may then be supplied with electrical current by a variable electrical power supply 20 having three output terminals: two current output terminals which are connected to the power supply electrodes 1 and 2, respectively, and a reference terminal which is connected to the additional electrode 3. The electroactive substances are then oxidized and reduced simultaneously in contact with the power supply electrodes 1 and 2, in the usual manner. When the additional electrode 3 is in contact with the portions of liquid and/or gel in the cells 13, that is to say, in the absence of the insulating film 4, the additional electrode 3 serves to fix the electrical potential inside the overall volume V. Indeed, it serves to fix the electrical voltage that exists between at least one of the electrodes 1 or 2 on the one hand, and a portion of the liquid and/or gel which is distant from the electrodes 1 and 2 and within each cell 13. In this way, the electrical potential can be controlled at any time throughout, or nearly throughout, the volume V. This ensures in particular that wide differences in electrical potential do not occur at any time between the different points of the volume V, which could cause irreversible damage to some of the electroactive substances. The service life of the electrochromic system 100 is thereby lengthened. When it has such a function, the additional electrode 3 is commonly called the reference electrode. However, the electrical potential of the additional electrode 3 must not exceed limit values, with regard to the respective electrical potentials of the two power supply electrodes 1 and 2, to prevent some of the electroactive species from being irreversibly damaged in contact with the electrode 3. In other words, the value of the electrical potential of the additional electrode 3 is selected to guarantee that all of each portion of liquid and/or gel contained in one of the cells 13 remains within an electrochemical stability range of the system. This stability range is generally broader than the interval of values of the electrical potential that corresponds to the switching of the electrochromic system, so that the electrical potential of the additional electrode 3 is not necessarily intermediate between those of the two power supply electrodes 1 and 2.

An additional function of the additional electrode 3 may be to attract or to repel some electroactive substances which are electrically charged, after having reacted on one or the other of the power supply electrodes. The oxidized and reduced electroactive substances are thus partly kept apart from one another. In this way, a mutual neutralization of the electroactive substances in the absorbing state of the system can be decreased. A permanent coloration of the electrochromic system 100 can thereby be obtained, which is more uniform, with lower electrical current consumption. From a reading of this description, a person skilled in the art will know how to adjust the electrical potential of the additional electrode 3 to obtain this additional function, in particular according to the electrical charges of the electroactive species which are attracted or repelled at a given moment of the operation of the electrochromic system 100. This electrical potential of the additional electrode 3 may be adjusted to a value lying between the respective values of the electrical potential of the two power supply electrodes 1 and 2, or which lies outside the interval that is bounded by the latter two values. In the latter case, the insulating film 4 is necessary, again to prevent some of the electroactive species from reacting or from being irreversibly damaged in contact with the electrode 3.

Figure 3:
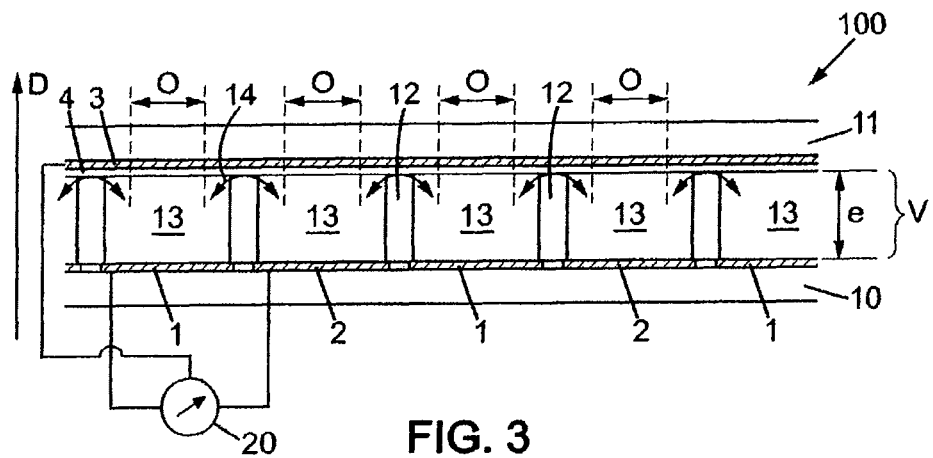

The electrochromic system in FIG. 3 corresponds to that in FIG. 1, for the configuration having a single power supply electrode per cell 13. The operation and use of the additional electrode 3, as a reference electrode or electrostatic attraction/repulsion electrode of some of the electroactive species, are identical.

Figure 4:
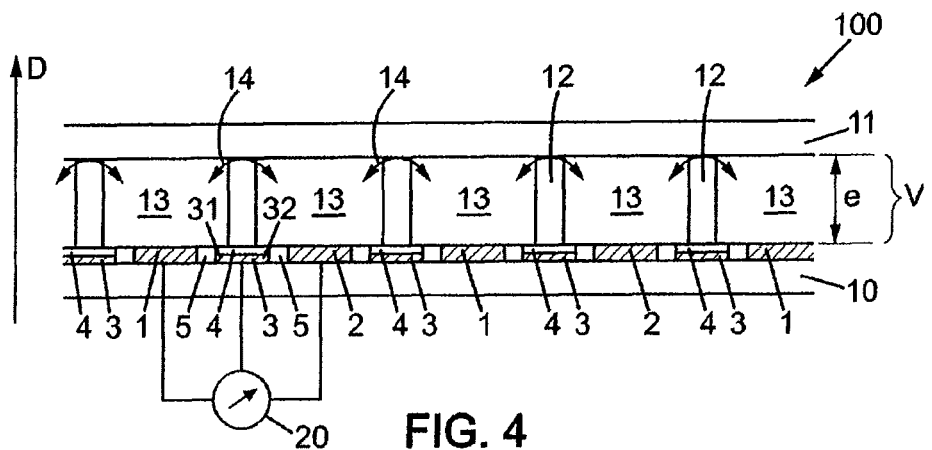
Figure 5:
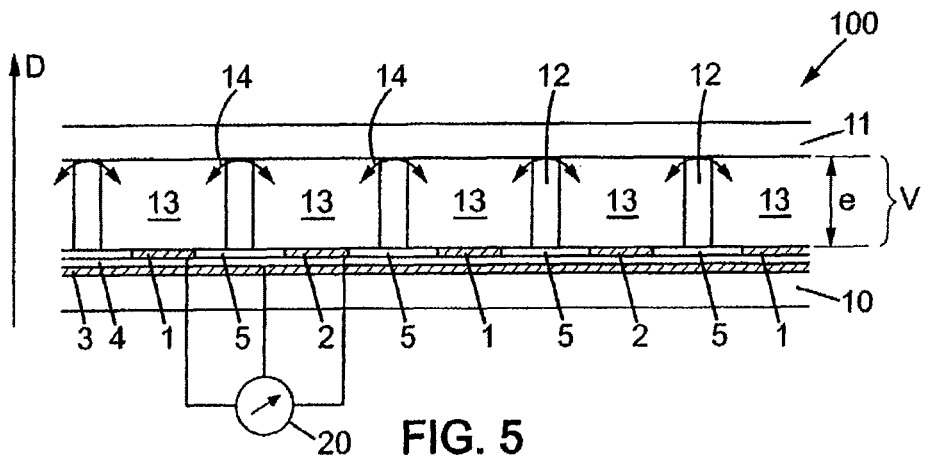

The electrochromic systems in FIGS. 4 and 5 correspond to that in FIG. 3, except that the additional electrode 3 is carried by the same outer wall as the power supply electrodes 1 and 2, that is to say, the wall 10. If, as shown in these two figures, the additional electrode 3 is electrically isolated from the portions of liquid and/or gel contained in the cells 13, the additional electrode 3 is limited to an electrostatic attraction/repulsion function of some of the electroactive species.

In the embodiment in FIG. 4, the additional electrode 3 is placed between the two power supply electrodes 1 and 2, parallel to the outer wall 10. For this purpose, a continuous layer of an electrically conductive material may first be deposited on the entire face of the outer wall 10 concerned. It is then selectively etched in order to mutually isolate a first portion of this layer which is intended to form the power supply electrode 1, a second portion of this layer which is intended to form the power supply electrode 2, and a third portion which is intermediate between the portions of the electrodes 1 and 2 and intended to form the additional electrode 3. The electrode 3 may thus be located between the interlacing teeth of the combs of the electrodes 1 and 2, and has a continuous back-and-forth linear shape, that is to say, a meandering shape. Intervals in which the layer has been etched electrically insulate the electrode 3 from the electrodes 1 and 2. In this way, the additional electrode 3 and the power supply electrodes 1, 2 have identical constituent materials, and can be made in a one-step deposition of conductive material.

Some of the internal walls 12 may be located on the additional electrode 3. The additional electrode 3 then extends continuously between two cells 13 which are adjacent, parallel to the wall 10. Furthermore, it is located between the internal wall 12 separating these adjacent cells and the outer wall 10, along the direction D. To have a significant electrical effect in each cell 13, the additional electrode 3 may have projections 31, 32 on each side of an internal wall 12 which separates adjacent cells 13, beyond this wall 12. The projections have extensions greater than 2 µm, preferably greater than 3 µm, perpendicular to the internal wall 12.

In this embodiment of the invention, portions 5 of an electrically insulating and transparent material may be formed in the separation intervals between the additional electrode 3 and each of the electrodes 1 and 2. These portions 5, with a portion of film 4 which is located on the electrode 3, each prevent any electrical contact from occurring between the additional electrode 3 and the portions of liquid and/or gel which are contained in the cells 13.

Two alternative improvements of the embodiment in FIG. 4 are now described for reducing the visibility of the separation between the electrode 3 and each of the electrodes 1 and 2. In the first of these improvements, the portions 5 which are carried by the wall 10, the power supply electrodes 1 and 2, and the additional electrode 3, substantially have the same common optical thickness along the direction D perpendicular to the outer walls. Any portion of insulating film 4 located on the additional electrode 3 is included with the latter in the optical thickness. In other words, the system 100 substantially has the same optical thickness along the direction D across the portions 5, the electrodes 1 and 2, and the electrode 3 with the optional film 4. This adjustment of the optical thickness of the portions 5 reduces the light diffused or diffracted by the inter-electrode separation intervals on each side of the electrode 3. Alternatively, quantities of an absorbing material may be carried by the wall 10, between the additional electrode 3 and each of the power supply electrodes 1 and 2. Such quantities of absorbing material may also reduce the visibility of the intervals between the electrode 3 and the two electrodes 1 and 2, by reducing or eliminating the light that is transmitted across these intervals. The portions 5 may themselves consist of quantities of absorbing material, or the absorbing material may be an ink that is locally diffused in the wall 10 opposite the inter-electrode separation intervals.

In the embodiment in FIG. 5, the additional electrode 3 is again carried by the wall 10, like the power supply electrodes 1 and 2, but is placed between the wall 10 on the one hand and the electrodes 1 and 2 on the other hand, along the direction D. The film 4 is then located between the additional electrode 3 and each of the power supply electrodes 1 and 2. The function of the electrode 3 when arranged in this manner is again to attract or repel some of the electroactive species, according to the electrical charge and the operating status of the electrochromic system at a given time. In this case, the portions 5 may be replaced by a single portion, also referenced 5, which extends continuously between the edges of the power supply electrodes 1 and 2.

Figure 6:
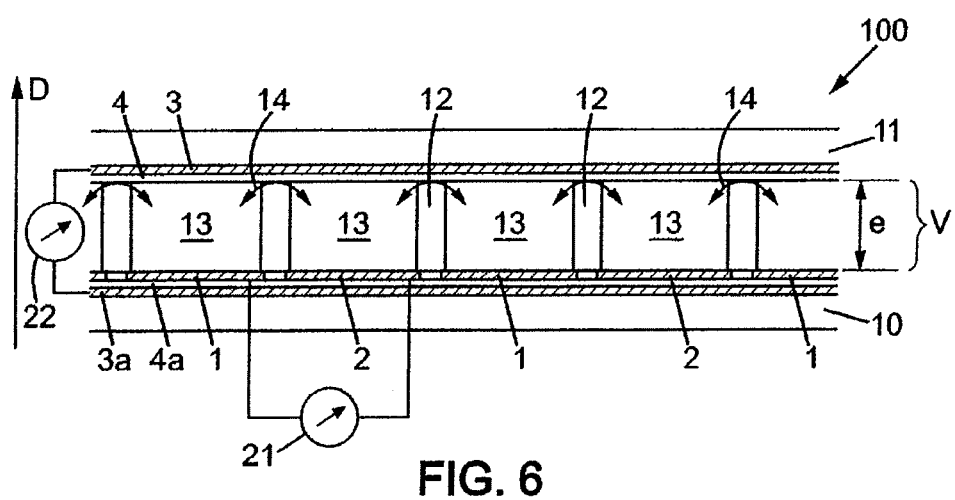

In general, an electrochromic system 100 according to invention may further comprise another additional electrode, which is carried by the other of the outer walls 10 and 11 than the one carrying the additional electrode 3. This other additional electrode is referenced 3a in FIGS. 2 and 6. In this way, the two additional electrodes 3 and 3a form a capacitor which contains the volume V. This capacitor creates an electrostatic field in the volume V, which also serves to attract or repel some of the electroactive substances. FIGS. 2 and 6 correspond respectively to FIGS. 1 and 3, while adding the electrode 3a. In these particular embodiments of the invention, the electrode 3a is carried by the wall 10.

In this case, the system 100 further comprises another electrically insulating film 4a, which is placed between said other additional electrode 3a and the portion of liquid and/or gel contained in each of the cells 13. In this way, electrical contact between the electrode 3a and each of the electrodes 1 and 2 is prevented, as well as the contact between the electrode 3a and the portion of liquid and/or gel. The system may then comprise an electrical power supply unit 21 with two electrical current output terminals. These two current output terminals are connected to the two power supply electrodes 1 and 2, respectively. They supply the current that is required for the oxidation and reduction of the electroactive substances responsible for the reversible coloration of the system 100. Furthermore, an electric polarization unit 22 is added to the system 100. The unit 22 has two electrical voltage output terminals which are connected to the additional electrodes 3 and 3a, respectively. The unit 22 serves to create an additional electric field in the volume V, to cause a migration of at least some of the electroactive substances that are electrically charged, toward the power supply electrodes 1 and 2 or, on the contrary, toward the wall 11. An appropriate selection of the polarity of the electrodes 3 and 3a during a transition of the system 100 from the clear state to the absorbent state, or conversely, from the absorbent state to the clear state, and also an appropriate selection of the bias voltage that is delivered by the unit 22, serves to accelerate this transition. The response time of the system 100 can thereby be shortened. The insulating film 4 covering the electrode 3 is again required if, at a time of the operation of the electrochromic system, the electrical potential of this electrode lies outside the interval bounded by the respective values of the electrical potentials of the power supply electrodes 1 and 2.

It is also possible to reduce the mutual neutralization between the electroactive substances which are oxidized and reduced on the power supply electrodes 1 and 2 in the absorbent state, by applying an adequate electrical voltage between the electrodes 3 and 3a. For example, some of the electroactive substances that have been oxidized or reduced on the power supply electrodes 1 and 2 may, when charged, be kept separately in the vicinity of these power supply electrodes, by the electric field which is produced by the additional electrodes 3 and 3a.

In general and optionally, to improve the transient operation of the system 100, an electrical voltage may be applied between one of the additional electrodes 3 or 3a on the one hand, and at least one of the power supply electrodes 1 and 2 on the other hand, so that the electrode 3 or 3a concerned has an electrical potential that lies outside an interval bounded by the respective electrical potentials of the power supply electrodes 1 and 2. At least one of the electroactive substances is then electrostatically attracted toward this electrode 3 or 3a.

When only one of the power supply electrodes 1, 2 is in contact with the portion of liquid and/or gel contained in each cell 13, and when the additional electrode 3 is carried by the other of the outer walls 10, 11 than the one carrying the power supply electrodes (FIGS. 3 and 6), it may be advantageous for at least some of the internal walls 12 to extend up to the additional electrode 3 along the direction D. In this way, the walls 12 prevent the electroactive species which are located near the additional electrode 3 from passing from a cell to an adjacent cell. Thus, electroactive species which are attracted by the additional electrode 3 in these different cells 13 are not mutually neutralized. In this case, the ionic bridge 14 can be made across the internal walls 12, or by a passage located at the ends of these walls 12 that are located on the side of that of the outer walls 10, 11 which carries the power supply electrodes 1 and 2. When the insulating film 4 is present on the additional electrode 3, the internal walls 12 extend up to this film 4 to similarly close the cells 13 on the side of the outer wall 11, for the electroactive substances.

It is understood that the invention may be reproduced by adapting features which have been mentioned as examples, while preserving at least some of the advantages mentioned. In particular, a person skilled in the art will understand that the positions of the additional electrode or electrodes which are introduced by the invention, with regard to the outer walls of the system, may be combined at will with the arrangements of the internal walls with regard to the power supply electrodes.

Furthermore, the values of the concentrations and/or dimensions of the elements of the electrochromic system may be modified for each application concerned. Additional ionic substances may thus be added to the composition of the liquid and/or gel, in particular to increase its ionic conduction.

The invention claimed is:

1. A transparent electrochromic system, allowing clear vision across said system, and comprising:
   parallel first and second outer walls, the system being transparent for a viewing direction across the outer walls between two opposite sides;
   a network of internal walls placed between the outer walls, said internal walls extending perpendicularly to said outer walls and defining a set of cells juxtaposed in parallel to said outer walls;
   portions of liquid and/or gel contained respectively in the cells;
   first and second electroactive substances distributed in the portions of liquid and/or gel, with respective electrical redox potentials that are different, at least some of the first and second electroactive substances having a variable optical effect between an oxidized form and a reduced form of said substances;
   two transparent power supply electrodes carried together by the first outer wall, and configured to be connected respectively to two power supply terminals of a variable electrical power supply unit, each of said power supply electrodes being in direct electrical contact with the portions of liquid and/or gel contained in at least some of the cells for transferring electrons to or from at least some of the electroactive substances, in an inverse way between said first and second electroactive substances at a given time; and
   a first additional transparent electrode without direct electrical contact with said power supply electrodes inside the electrochromic system, said first additional transparent electrode being parallel to said power supply electrodes inside at least some of the cells.

2. The system as claimed in claim 1, further comprising, for at least some of the cells, an electrically insulating film placed between the first additional transparent electrode and the portion of liquid and/or gel contained in each of said cells, so as to prevent contact between said portion of liquid and/or gel and the first additional transparent electrode.

3. The system as claimed in claim 1, in which the first additional transparent electrode is carried by the second outer wall.

4. The system as claimed in claim 3, in which the first additional transparent electrode extends continuously between two adjacent cells along directions parallel to the outer walls.

5. The system as claimed in claim 4, in which the first additional transparent electrode extends without interruption facing at least a portion of all of the cells.

6. The system as claimed in claim 4, in which the first additional transparent electrode has an opening aligned with a central portion of at least some of the cells, along a direction perpendicular to the outer walls.

7. The system as claimed in claim 1, in which the first additional transparent electrode is carried by the first outer wall, and is placed between said two power supply electrodes along a direction parallel to said first outer wall.

8. The system as claimed in claim 7, in which the first additional transparent electrode and the power supply electrodes have identical constituent materials.

9. The system as claimed in claim 7, in which the first additional transparent electrode extends continuously between two adjacent cells, and is located between the internal wall separating said adjacent cells and the first outer wall.

10. The system as claimed in claim 9, in which the first additional transparent electrode has projections on each side of the internal wall separating said adjacent cells, said projections having extensions greater than 2 μm perpendicular to said internal wall.

11. The system as claimed in claim 7, further comprising portions of an insulating and transparent material carried by the first outer wall, between the first additional transparent electrode and each of the power supply electrodes, so that the system substantially has the same optical thickness along a direction perpendicular to the outer walls, across said portions of insulating and transparent material.

12. The system as claimed in claim 7, further comprising quantities of an absorbing material carried by the first outer wall, said quantities of absorbing material being located between said first additional transparent electrode and each of the power supply electrodes.

13. The system as claimed in claim 2, in which the first additional transparent electrode is carried by the first outer wall and is placed between said first outer wall and said two power supply electrodes, along a direction perpendicular to the first outer wall, the insulating film further being placed between said first additional transparent electrode and each of said power supply electrodes.

14. The system as claimed in claim 1, further comprising a second additional transparent electrode carried by the first outer wall, which said first additional transparent electrode is carried by the second outer wall.

15. The system as claimed in claim 14, further comprising, for at least some of the cells, an electrically insulating film placed between the second additional transparent electrode and the portion of liquid and/or gel contained in each of said cells, so as to prevent contact between said portion of liquid and/or gel and said second additional transparent electrode.

16. The system as claimed in claim 1, in which the portions of liquid and/or gel contained in at least some of the cells are each in direct electrical contact with the two power supply electrodes inside the corresponding cells.

17. The system as claimed in claim 1, in which the two power supply electrodes are placed so that each portion of liquid and/or gel contained in a cell is in direct electrical contact with only one of said power supply electrodes, and so that each cell electrically supplied by one of the two power supply electrodes is adjacent to at least one other cell electrically supplied by the other power supply electrode, and the system further comprising an ionic bridge connecting said adjacent cells.

18. The system as claimed in claim 17, in which the first additional transparent electrode is carried by the second outer wall and at least some of the internal walls extend to the first additional transparent electrode, along a direction perpendicular to the outer walls, so that said internal walls prevent electroactive species which are located close to said first additional transparent electrode from passing from a cell to an adjacent cell.

19. The system as claimed in claim 1, further comprising an electrical power supply unit having first, second, and third output terminals, said first and second output terminals being connected electrically and respectively to the two power supply electrodes to generate an electrical current flowing in the system, said third output terminal of the electrical power supply unit being connected to the first additional transparent electrode, and the power supply unit being suitable for variably controlling at least one electrical voltage present between one of said power supply electrodes and the first additional transparent electrode.

20. The system as claimed in claim 14, further comprising:
an electrical power supply unit having two electrical current output terminals connected respectively to the two power supply electrodes of the system, and
an electric polarization unit having two electrical voltage output terminals connected respectively to the first additional transparent electrode and to said second additional transparent electrode.

21. The system as claimed in claim 1, forming a glazing, an aircraft window, an ophthalmic lens, a helmet visor, a mask glass, or a wafer configured to be applied to an ophthalmic lens, a helmet visor or a mask glass.

22. A method for using a transparent electrochromic system as claimed in claim 1, whereby an electrical voltage is applied between the first additional transparent electrode and at least one of the power supply electrodes, so that said first additional transparent electrode has an electrical potential lying outside an interval bounded by respective electrical potentials of said power supply electrodes.

* * * * *